(12) United States Patent
Wieczorek

(10) Patent No.: US 10,279,710 B2
(45) Date of Patent: May 7, 2019

(54) MOTOR VEHICLE WITH FIXATION ELEMENT FOR CHILD SEAT

(71) Applicant: GM GLOBAL TECHNOLOGY OPERATIONS LLC, Detroit, MI (US)

(72) Inventor: Roman Wieczorek, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/693,734

(22) Filed: Sep. 1, 2017

(65) Prior Publication Data
US 2018/0065512 A1 Mar. 8, 2018

(30) Foreign Application Priority Data

Sep. 2, 2016 (DE) .................... 10 2016 010 656

(51) Int. Cl.
*B60N 2/28* (2006.01)
*B60N 2/26* (2006.01)

(52) U.S. Cl.
CPC ............. *B60N 2/2887* (2013.01); *B60N 2/26* (2013.01); *B60N 2/28* (2013.01); *B60N 2/289* (2013.01); *B60N 2/2893* (2013.01)

(58) Field of Classification Search
CPC .......... B60N 2/26; B60N 2/28; B60N 2/2887; B60N 2/289; B60N 2/2893
USPC ................................ 297/253, 254, 256.16
See application file for complete search history.

(56) References Cited

U.S. PATENT DOCUMENTS

| 6,601,917 | B1 | 8/2003 | Christopherson |
| 9,340,128 | B2* | 5/2016 | Arai ..................... B60N 2/2887 |
| 9,604,555 | B2* | 3/2017 | Fujikake ............... B60N 2/289 |
| 9,676,304 | B2* | 6/2017 | del Puerto Camargo .................. B60N 2/2887 |
| 2002/0104190 | A1* | 8/2002 | Moore ................. B60N 2/2809 16/231 |
| 2015/0084388 | A1 | 3/2015 | Arai et al. |
| 2018/0118065 | A1* | 5/2018 | Okuhara .............. B60N 2/5833 |

FOREIGN PATENT DOCUMENTS

| DE | 19708044 C1 | 6/1998 |
| DE | 20006692 U1 | 8/2001 |
| DE | 10044621 C1 | 2/2002 |
| DE | 102009036726 A1 | 2/2011 |
| DE | 10 2016 213 264 | * 1/2018 |
| EP | 3000654 A1 | 3/2016 |
| FR | 2975643 A1 * | 11/2012 ............ B60N 2/289 |
| FR | 3014043 A1 | 6/2015 |
| GB | 2522797 A | 8/2015 |

(Continued)

*Primary Examiner* — Robert Canfield
(74) *Attorney, Agent, or Firm* — Lorenz & Kopf, LLP

(57) ABSTRACT

A motor vehicle includes a passenger compartment having at least one vehicle seat and a fixation element fixing a child seat with a counter-fixation element. A flap with a front side and back side that can be moved between a closed position and an open position, so that the fixation element is inaccessible for the counter-fixation element in the closed position of the flap, and the fixation element is accessible for the counter-fixation element in the open position of the flap. The flap is mounted in such a way that, in the open position of the flap, a back side of the flap forms a ramp for the counter-fixation element to mechanically guide the counter-fixation element to the fixation element.

14 Claims, 5 Drawing Sheets

(56) References Cited

FOREIGN PATENT DOCUMENTS

| | | | | |
|---|---|---|---|---|
| JP | 2015036282 A | * | 2/2015 | ............. B60N 2/289 |
| KR | 201500113226 A | | 10/2015 | |

* cited by examiner

MOTOR VEHICLE WITH FIXATION ELEMENT FOR CHILD SEAT

CROSS-REFERENCE TO RELATED APPLICATION

This application claims priority to German Patent Application No. 102016010656.5, filed Sep. 2, 2016, which is incorporated herein by reference in its entirety.

TECHNICAL FIELD

The present disclosure pertains to a motor vehicle having a fixation element for securing a child seat in the passenger compartment of the vehicle.

BACKGROUND

Motor vehicles with an internal combustion engine and/or electric motor for driving the motor vehicle have a passenger compartment with vehicle seats for accommodating occupants including children, and a luggage compartment for accommodating cargo. Front seats and rear seats are arranged in the passenger compartment, and the rear seats are normally combined to yield a rear seat bench. A back part of a rear seat generally separates the luggage compartment from the passenger compartment.

Two respective fixation elements for fixing a child seat are formed on one or both sides of the rear bench seat. For example, the fixation elements are designed as a rod, to which a respective counter-fixation element of the child seat can be fixed. The fixation element is formed inside of a recess or blind hole in the seat upholstery. The recess can be closed at a front end region by a swivelable flap. The swivelable flap is mounted to the vehicle seat so that it can swivel around a pivoting axis at a first or nominal upper end or at an end region of the flap proximate the nominal upper end. The blind hole is bordered by a frame, and the frame is spaced apart in a vertical direction or Z-direction of the motor vehicle from the seat surface of the seat part in the region of the recess at a front end region of the recess. When the two flaps are open, it is thus necessary when introducing a counter-fixation element of the child seat to lift the child seat in a vertical direction, so that the counter-fixation element can be introduced into the recess or blind hole. As a result, the motor vehicle offers little comfort in establishing the positive connection between the counter-fixation element on the child seat and the fixation element on the seat. Two counter-fixation elements are formed on the child seat, and two fixation elements are arranged in a respective recess and formed on the seat of the motor vehicle. The flap is mounted to the frame so that it can swivel upwardly from the closed position into the open position around a pivoting axis in the region of a nominal upper end of the flap.

EP 3 000 654 A1 describes a child seat anchor fitting. A cover part can be moved on a base part between a closed position and open position. DE 100 44 621 C1 shows a motor vehicle seat with a retaining device for detachably, rigidly fastening an object, such as a child seat, onto the motor vehicle seat. The retaining device is arranged roughly in the interstice between the back contact surface and seat surface of the motor vehicle seat inside of the seat upholstery, and can be covered by a cover when not in use. The retaining device is arranged in a shaft surrounded by the upholstery, which opens into the upholstery surface and can be closed by a flap swivelably mounted to the shaft.

SUMMARY

The present disclosure provides a motor vehicle in which counter-fixation elements can be easily, comfortably and reliably fixed to fixation elements of the motor vehicle. The motor vehicle includes a drive motor, in particular an internal combustion engine and/or electric motor, a body, a passenger compartment, at least one vehicle seat with a seat part and a back part. A fixation element is located in the region of the at least one vehicle seat and/or on the at least one vehicle seat for fixing a child seat with a counter-fixation element. A flap with a front side and back side can be moved between a closed position and an open position, so that the fixation element of the flap is inaccessible for the counter-fixation element in the closed position of the flap, and the fixation element is accessible for the counter-fixation element in the open position of the flap. The flap is mounted in such a way that, in the open position of the flap. The flap, in particular the back side or front side of the flap, forms a ramp for the counter-fixation element to mechanically guide the counter-fixation element to the fixation element. The front side or back side of the flap of the motor vehicle acts as a ramp in the open position. To introduce a counter-fixation element on the child seat into the recess and/or the blind hole on the motor vehicle with the fixation element, it is thus only necessary to displace the child seat placed on the seat surface of the seat part toward the back. As a result of the configuration of the flap as a ramp, a respective counter-fixation element is supported on the flap, in particular on a back side or front side of the flap in the open position, thereby causing the counter-fixation element to glide or slide on the flap, in particular on the back side of the flap, as a result of which the counter-fixation element is automatically lifted vertically upward by the backward movement of the child seat relative to the motor vehicle, and can thus be automatically introduced into the recess with the fixation element. This significantly improves comfort and handling while establishing a positive connection between the counter-fixation elements on the child seat and the two fixation elements on the vehicle seat of the motor vehicle.

In an exemplary configuration, the flap has a first or nominal upper end and a second or nominal lower end in the closed position of the flap, and the first end of the flap is arranged beneath the second end of the flap in a vertical direction in the open position of the flap. As a result, then, the back side of the flap has a gradient in the open position, so that a counter-fixation element on the back side of the flap glides along the back side of the flap given a backward movement of the child seat, and can here be moved vertically upward.

In a variant configuration, the flap is mounted by a bearing in the region of the nominal lower end so that it can swivel around a pivoting axis, to swivel the flap between the closed position and open position and vice versa, wherein the distance between the bearing and nominal lower end of the flap is less than 40%, 30%, 20% or 10% of the expansion of the flap from the nominal lower end to the nominal upper end of the flap. For example, the bearing is designed as a slide or roller bearing.

The bearing is preferably designed as a slide bearing, and pins are present on the side of the flap on a lower end region, which are arranged in corresponding bearing cutouts on the remaining vehicle, in particular on the frame. The flap is preferably mounted on a frame.

In a supplementary embodiment, a blind hole and/or an exit and/or a shaft is formed on and/or behind the frame, and the fixation element is arranged inside of the blind hole. For example, a blind hole and/or a recess is present on an upholstery of the seat, and a front end region of the blind hole is preferably bordered by a frame.

In another embodiment, a front lower end of the frame, which borders the blind hole, is arranged under the nominal lower end of the flap in the open position and/or closed position of the flap, in particular in a vertical direction. While the counter-fixation element is being introduced and glides on the back side of the flap, the counter-fixation element automatically gets into the recess or blind hole after the counter-fixation element has stopped gliding on the back side of the flap.

In another embodiment, the flap can be detachably fastened in the closed position with a latching device. The latching device is best detachable by an actuator, in particular a button, and/or the latching device is designed in such a way that the latching device can be automatically detached after a limit opening force acting on the flap has been reached. As a consequence, only the limit opening force need be manually applied to the flap, so that the latching device is thereby automatically detached, and the flap can be moved, in particular swiveled, from the closed position into the open position.

In another embodiment, the flap has a handle for manually applying an opening force to the flap.

The handle is preferably formed by the nominal upper end and/or the nominal upper end region of the flap, and a gap between the nominal upper end and/or the nominal upper end region of the flap and frame is preferably present in the closed position of the flap so as to manually engage the nominal upper end and/or the nominal upper end region of the flap from behind. The nominal upper end region or upper end region of the flap is at the nominal upper end. The nominal lower end region or the lower end region of the flap is at the nominal lower end of the flap.

In an additional embodiment, the motor vehicle has an elastic element, preferably a spring, in particular a torsion spring, so that the flap can be automatically moved from the closed position to the open position by a force applied to the flap by the elastic element. The force applied to the flap by the elastic element must be surmounted to move the flap from the open position into the closed position. An opening force can preferably only be applied to the flap by the elastic element starting at a specific open position, in particular a specific opening angle, of the flap.

In a supplementary embodiment, the back side of the flap has a guiding groove for mechanically guiding the counter-fixation element on the child seat to the fixation element. While the counter-fixation element glides or slides on the back side of the flap, the guiding groove can thus prevent the counter-fixation element from laterally sliding on the back side of the flap. This ensures the good and precise guidance of the counter-fixation element as the counter-fixation element glides on the back side of the flap.

In another embodiment, the back side of the flap is concave in a cross section of the flap. The concave in the cross section makes it possible to configure a guiding groove in an especially advantageous manner. Consequently, no steps are preferably present on the guiding groove.

In an additional embodiment, the nominal upper end of the flap is spaced less than 1 cm away from a seat surface of the seat part of the vehicle seat in the open position of the flap.

In a supplemental variant, the nominal upper end of the flap and/or a nominal upper end region of the flap rests upon the seat surface of the seat part of the motor vehicle seat in the open position of the flap. As a result, given little or no distance between the nominal upper end of the flap and seat surface of the seat part, there is no danger that the nominal upper end of the flap will form a stop for the counter-fixation element on the child seat.

In another embodiment, at least 70%, 80% or 90% of the volume of the flap is arranged outside of the blind hole in the open position of the flap. In the open position of the flap, most of the flap can thus serve as a ramp, since a majority of the flap is arranged outside of the blind hole.

In another embodiment, the pivoting axis of the flap is essentially aligned in the Y-direction or transverse direction of the motor vehicle. Essentially preferably means that the pivoting axis of the flap is aligned with a deviation of less than 30°, 20°, 10° or 5° relative to the Y-direction.

In a supplementary variant, the bearing for the flap is formed on a lower half, a lower third or a lower fourth of the flap, in particular in the region of the nominal lower end of the flap, preferably exclusively.

The flap with the bearing is preferably mounted so that it can move between the closed position and open position in a swiveling movement or rotational movement and/or preferably a translational movement. Given a translational movement of the flap from the closed position into the open position, the nominal upper end of the flap can be moved down, and the nominal lower end of the flap can be moved forward, so that the front side also forms a ramp in the open position.

In another embodiment, the height of the guide webs increases, continually, from the nominal upper end to the nominal lower end of the flap.

In another variant, the nominal lower end of the flap is arranged inside of the blind hole in the open position.

The nominal upper end of the flap is best arranged outside of the blind hole in the open position.

In another embodiment, the vehicle seat is at least one rear seat, and the back part of the rear seat separates the passenger compartment from the luggage compartment.

In a variant, the at least one fixation element is a rod, a hook or a lug.

In an additional embodiment, the at least one fixation element is at least partially or completely made out of metal, in particular steel or aluminum.

The counter-fixation element is configured as a hook, a closable ring or a rod with a closable slit.

In another embodiment, two fixation elements as well as components allocated to the fixation element are formed on one vehicle seat each, with the components described herein being the flap, the frame, the latching device, the bearing for the flap and/or the elastic element.

In another embodiment, the back side faces the blind hole and/or borders the blind hole, and the front side of the flap faces the passenger compartment and/or borders the passenger compartment in the closed position of the flap.

A motor vehicle includes two vehicle seats with fixation elements. In a variant, the child seat has at least one fixation element or two fixation elements.

In another embodiment, the X-direction is a longitudinal direction of the motor vehicle. In an additional variant, the Y-direction is a transverse direction of the motor vehicle. The Z-direction is preferably a vertical direction of the motor vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
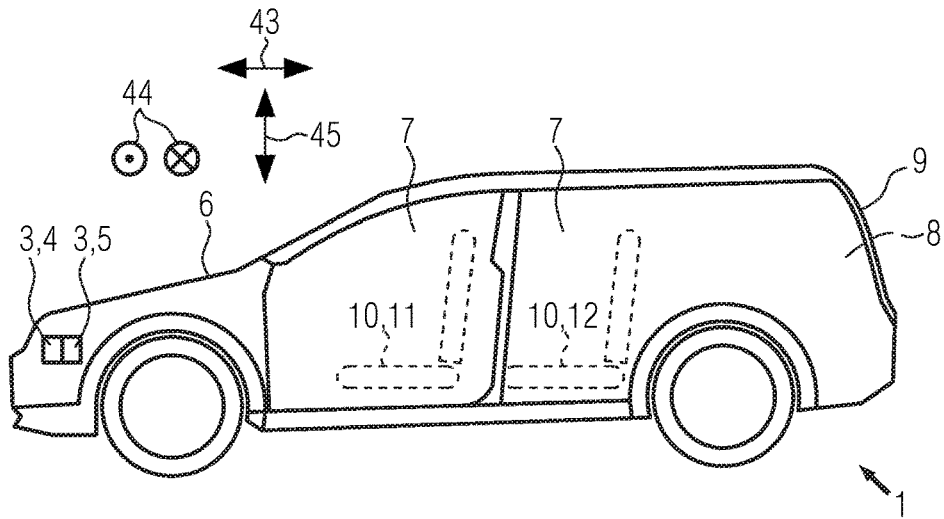
FIG. 1 is a side view of a motor vehicle.
Figure 2:
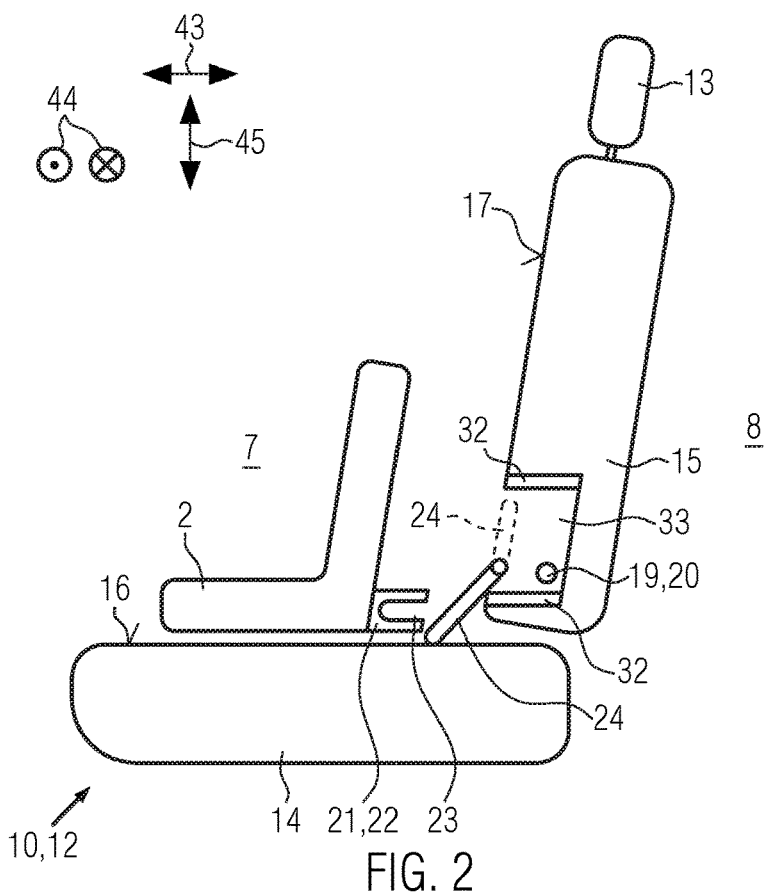
FIG. 2 is a longitudinal section of a rear seat of the motor vehicle according to FIG. 1.

A motor vehicle 1 shown on FIG. 1 has a body 6. The motor vehicle 1 can be driven by at least one drive motor 3, e.g., an internal combustion engine 4 and/or an electric motor 5. The body of the motor vehicle 1 borders both a passenger compartment 7 for accommodating passengers and a luggage compartment 8 for accommodating cargo. The luggage compartment 8 is accessible via a tailgate 9, and vehicle doors are formed on the side of the body 6 for passengers to enter and exit the passenger compartment 7. The passenger compartment 7 has several vehicle seats 10, specifically two front seats 11 as the driver seat and passenger seat, and three rear seats 12, which are combined to yield a rear seat bench. A respective headrest 13 is fastened to a back part 15 on the vehicle seats 10, and the vehicle seat 10 additionally also has a seat part 14. The seat part 14 has a seat surface 16, and the back part 15 has a back surface 17. The seat and back surfaces 16, 17 are used to accommodate a person or passenger on the vehicle seat 10. On the rear seats 12, the back part 15 separates the passenger compartment 7 from the luggage compartment 8.

Figure 5:
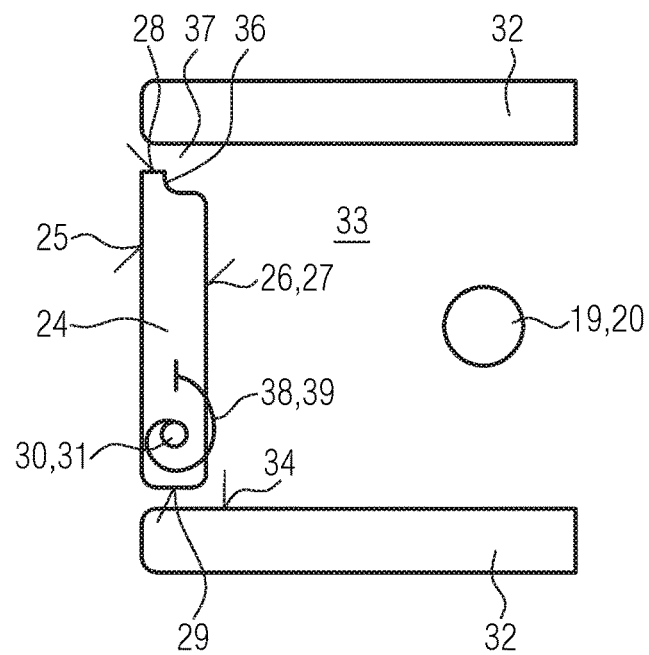
FIG. 5 is a longitudinal section of the frame with fixation element and flap of the rear seat according to FIG. 3 with the flap in a closed position.
Figure 6:
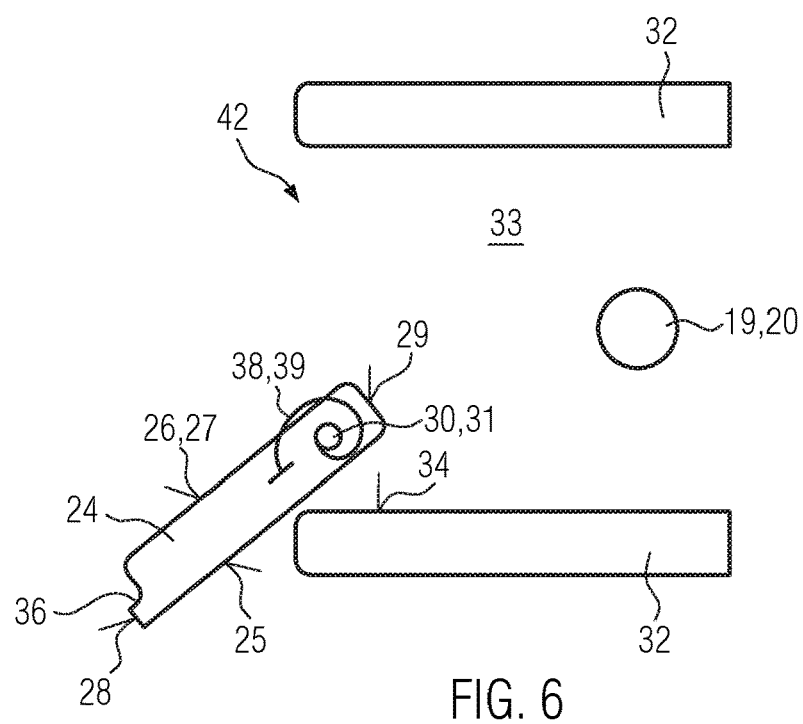
FIG. 6 is a longitudinal section of the frame with fixation element and flap of the rear seat according to FIG. 3 with the flap in an open position.

The two side rear seats 12 each have two fixation elements 19 (e.g., Isofix fixation elements) for fixing a child seat 2 in place. For this purpose, two fixation elements 19 are formed in the lower end region of the back part 15 on the back surface 17 or an interstice between the back surface 17 and seat surface 16. The fixation element 19 (FIGS. 4 to 6) is formed by a rod 20 included of steel, which is arranged on the motor vehicle 1 inside of a recess 33 or a blind hole 33 on the back part 15. The fixation element 19 as a rod 20 is used for fixing the child seat 2 in place. The rod 20 is part of a bracket, and the bracket is indirectly or directly fastened to the body 6, for example to a frame of the rear seat 12.

The back of the child seat 2 has two counter-fixation elements 21 as a counter-rod 22. A respective slit 23 is formed in the counter-rods 22 in the longitudinal direction, so that the rod 20 can thereby be introduced into the slit 23 as the fixation element 19. In addition, a locking device is formed on each counter-fixation element 21, and the locking device can be used to detachably and positively fix the rod 20 in place inside of the slit 23.

Figure 3:
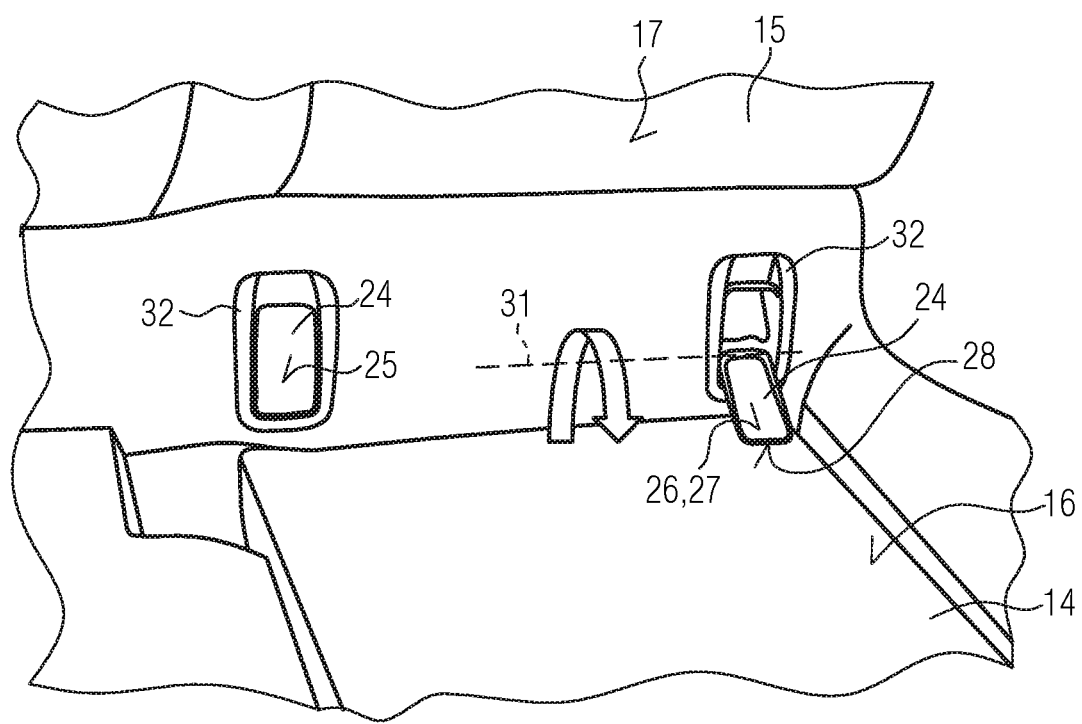
FIG. 3 is a perspective partial view of the rear seat according to FIG. 2.

The two fixation elements 19 are arranged inside of the blind hole 33 or recess 33 on the rear seat 12 in the region between the seat part 14 and back part 15, in particular on the back part 15. The recess 33 can be closed by a swivelable flap 24, meaning a blind hole opening 42 as an end of the blind hole 33 or the recess 33 is closed by the flap 24 in the closed position of the flap 24, and the blind hole is accessible in the open position of the flap 24, so that the blind hole opening 42 is not closed, and a respective counter-fixation element 21 can be introduced into the blind hole 33. On FIG. 3, the flap 24 shown on the left is in the closed position, and the flap 24 shown on the right is in the open position. The flap 24 has a front side 25 and a back side 26. In the closed position of the flap 24, the flap 24 has a first or nominal upper end 28 and a second or nominal lower end 29. The nominal upper end 28 and nominal lower end 29 are here also not changed or identically understood even in the open position of the flap 24. In proximity to the nominal lower end 29, the flap 24 is mounted with a bearing 30 so that it can swivel around a pivoting axis 31. The pivoting axis 31 is essentially aligned in a Y-direction 44 or transverse direction 44 of the motor vehicle 1 and rear seat 12. An X-direction 43 is aligned in the longitudinal direction of the motor vehicle 1, and a Z-direction 45 is aligned in the vertical direction.

The blind hole 33 is partially bordered by a plastic frame 32, and a front end of the frame 32 also borders the passenger compartment 7 of the motor vehicle 1. In the closed position of the flap 24 shown on FIG. 5, a gap 37 arises between the nominal upper end 28 of the flap 24 and the frame 32. The upper end region of the flap 24 here has a step according to the depiction on FIG. 5, so that this step thereby forms a handle 36 for engaging the flap 24 from behind. The expansion of the gap 37 in the Z-direction 45 is here sufficiently large in design, so that the finger can be used to engage the upper end region of the flap 24 from behind by the handle 36, as a result of which the flap 24 can be moved from the closed position shown on FIG. 5 into the open position shown on FIG. 6 around the pivoting axis 31. In the closed position of the flap 24, the flap 24 is detachably fixed in the closed position by a latching device 35. However, the handle 36 is used to release this connection established by the latching device 35 in the region of the nominal upper end 28 of the flap 24 once a limit opening force applied to the flap 24 has been reached. After a slight pivoting angle from the closed position into a partially open position has been reached, an elastic element 38 as a torsion spring 39 is used to apply a torque to the flap 24 by a mechanism, as a result of which the flap 24 is then automatically swiveled into the open position shown on FIG. 6, and remains in the open position owing to gravity and the toque applied by the elastic element 38 to the flap 24.

Figure 4:
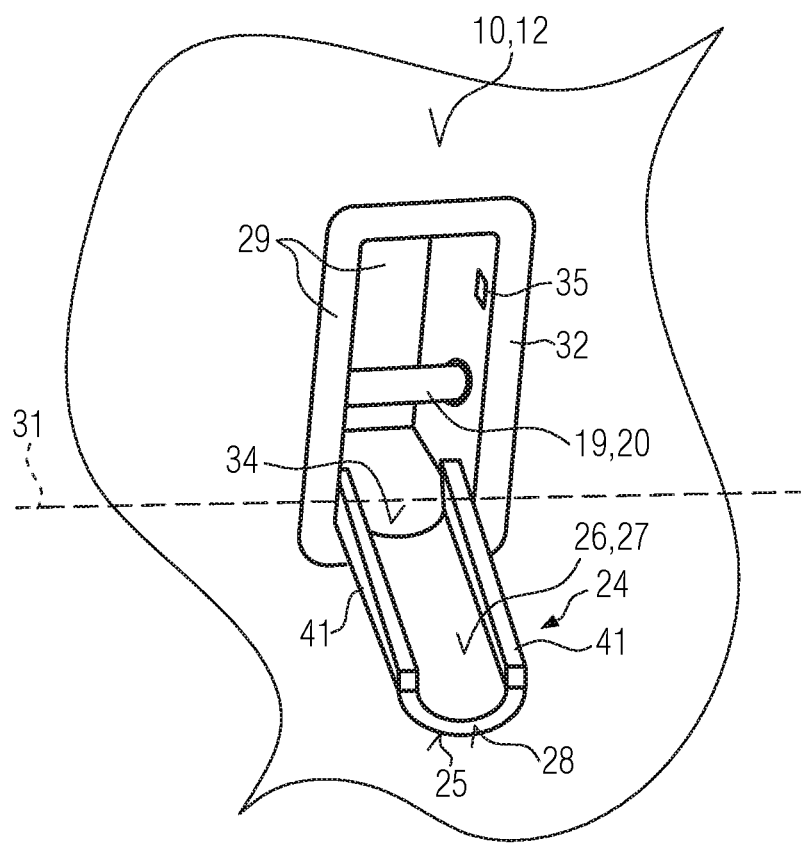
FIG. 4 is a perspective partial view of a frame with a fixation element and a flap of the rear seat according to FIG. 3.
Figure 7:
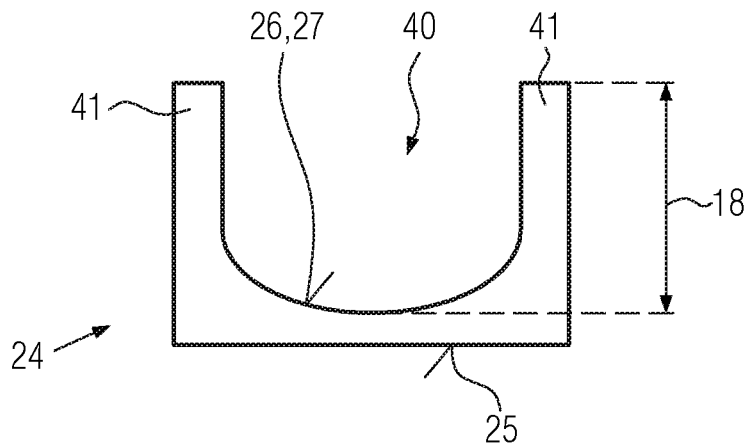
FIG. 7 is a cross section of the flap in the region of a second or nominal lower flap end.
Figure 8:
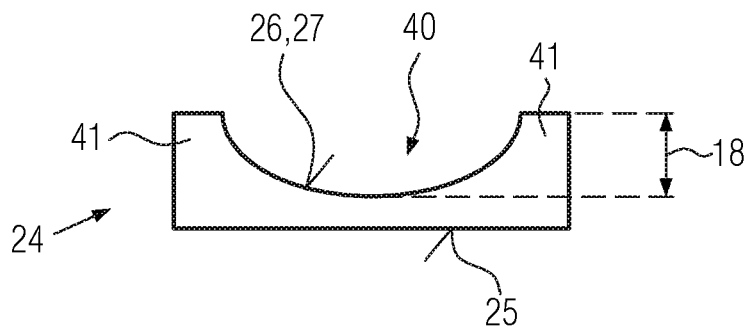
FIG. 8 is a cross section of the flap in the region of a first or nominal upper flap end.

The back side 26 of the flap 24 is concavely bent, and a respective guide web 41 is formed on the lateral end regions on the back side 26 (FIGS. 4, 7 and 8). Due to the concave surface of the back side 26 and the formation of the two lateral guide webs 41, a guiding groove 40 is present on the back side 26. The width of the guiding groove 40 is smaller than the width of the counter-fixation element 21, so that the lateral ends of a counter-fixation element 21 are essentially guided in the X-direction by the two guide webs 41. The height 18 of the guide webs 41 here increases in the direction from the nominal upper end 28 to the nominal lower end 29.

To fix the child seat 2 in place on the two fixation elements 19, the two flaps 24 must thus first be opened by applying a limit opening force to the handles 36. After opening the flap 24, the flap 24 is swiveled by the torsion spring 39 until the nominal upper end 28 of the flap 24 rests on the seat surface 16 of the seat part 14. The back side 26 of the flap 24 thus forms a ramp 27 for guiding the counter-fixation element 21 into the blind hole 33. The distance in the Y-direction 44 of the flaps 24 on a respective one vehicle seat here essentially corresponds to the distance between the two counter-fixation elements 21 on the child seat 2. After placing the child seat 2 onto the seat surface 16 of the seat part 14, the child seat 2 is only to be moved backward in the direction toward the back part 15 of the rear seat 12 until the back end region of the counter-fixation elements 21 is moved onto the ramp 27 as the back side 26 of the flap 24, after which a respective counter-fixation element 26 automatically glides upwardly onto the ramp 27, so that the counter-fixation elements 21 can thereby be introduced into the blind holes 33. In a simple manner, the guiding groove 40 prevents the counter-fixation elements 21 from laterally slipping on the ramp 27. The small height 18 of the lateral guide webs 21 in the region of the nominal upper end 28 of the flap 24 thus makes it especially easy to introduce or thread the counter-fixation elements 21 into the guiding groove 14 at the outset.

The nominal lower end 29 is arranged over a front lower end 34 of the frame 32. The front lower end 34 of the frame 2 borders a front lower end region of the blind hole 33. As a result of this arrangement of the nominal lower end 29 of the flap 24 in the open position of the flap 24, the bearing 30 has a simple design on the one hand, in addition to which the ramp 27 is thus arranged inside of the blind hole 33 at its rear end region, as a result of which a counter-fixation element 21 can be introduced and guided from the ramp 27 into the blind hole 33 in an especially safe and reliable manner, since the ramp 27 is also arranged slightly inside of the blind hole 33 in the open position of the flap 24.

Viewed overall, significant advantages are associated with the motor vehicle 1 according to the present disclosure. The flap 24 for closing the blind hole 33 in the closed position of the flap 24 that is necessary anyway can additionally serve as a ramp 27 for one respective counter-fixation element 21 each based on the structural design of the flap 24 in the open position of the flap 24. This makes it easy to reliably introduce the counter-fixation elements 21 into the blind holes 33, and hence fix the counter-fixation elements 21 on the fixation elements 19, while retaining a very good and practicable usability.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle seat comprising:
   at least one seat having a seat part, a back part and a fixation element configured to cooperate with a counter-fixation element of a child seat for securing the child seat to the at least one seat;
   a flap having a front side and a back side, the flap being movable around an axis between a closed position such that the fixation element is inaccessible from the flap for the counter-fixation element and an open position such that the fixation element is accessible for the counter-fixation element and the back side of the flap forms a ramp for mechanically guiding the counter-fixation element to the fixation element, the back side of the flap comprising:
   a guiding groove having a concave surface extending between a first side and a second side of the back side of the flap, the guiding groove having a first end proximate to the axis and a second end opposite the first end;
   a first guide web arranged on the first side of the back side of the flap, the first guide web extending vertically to a height from the guiding groove when the flap is in the open position; and
   a second guide web arranged on a second side of the back side of the flap, the second guide web extending vertically to a height from the guiding groove when the flap is in the open position,
   wherein the height of the first guide web and the height of the second web increases from the second end of the guiding groove to the first end of the guiding groove.

2. The motor vehicle seat according to claim 1, wherein the flap in its closed position has a first end and a second end, wherein the first end of the flap is arranged beneath the second end of the flap in a vertical direction when the flap is in the open position.

3. The motor vehicle seat according to claim 2, wherein the guiding groove mechanically guides the counter-fixation element on the child seat toward the fixation element.

4. The motor vehicle seat according to claim 3, wherein the axis comprises a bearing in the region of the second end of the flap such that the flap is swivelable around a pivoting axis between the closed position and open position.

5. The motor vehicle seat according to claim 3, wherein the flap is mounted on a frame.

6. The motor vehicle seat according to claim 5, wherein the frame has a blind hole formed therein and the fixation element is arranged within the blind hole.

7. The motor vehicle seat according to claim 6, wherein at least 70% of the flap by volume is arranged outside of the blind hole in the open position.

8. The motor vehicle seat according to claim 6, wherein the frame comprises a front lower end bordering the blind hole and arranged beneath the second end of the flap in a vertical direction.

9. The motor vehicle seat according to claim 3, further comprising a latching device detachably fastening flap in the closed position.

10. The motor vehicle seat according to claim 5, further comprising a handle on the flap configured to manual apply a force for moving the flap from the closed position to the open position.

11. The motor vehicle seat according to claim 10, wherein the handle is formed by the first end of the flap and a gap between the first end and the frame when the flap is in the closed position for engaging the first end of the flap from behind.

12. The motor vehicle seat according claim 3, further comprising a spring element biasing the flap in one of the open position or the closed position.

13. The motor vehicle seat according to claim 3, wherein the first end of the flap is spaced less than 1 cm away from a seat surface of the vehicle seat in the open position of the flap.

14. The motor vehicle seat according to claim 3, wherein an end region proximate the first end of the flap rests upon a seat surface of the vehicle seat in the open position of the flap.

\* \* \* \* \*